June 3, 1924.
J. C. CHAPMAN
1,496,298
CONNECTING LINK FOR DRIVE CHAINS
Filed April 19, 1923
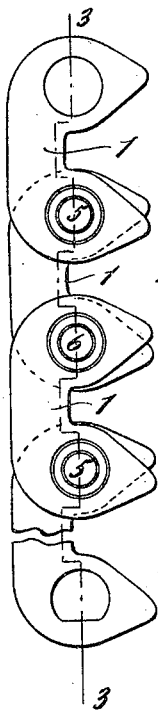
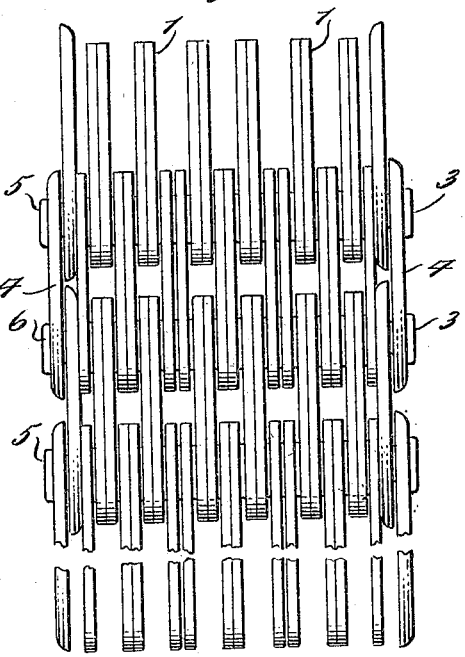
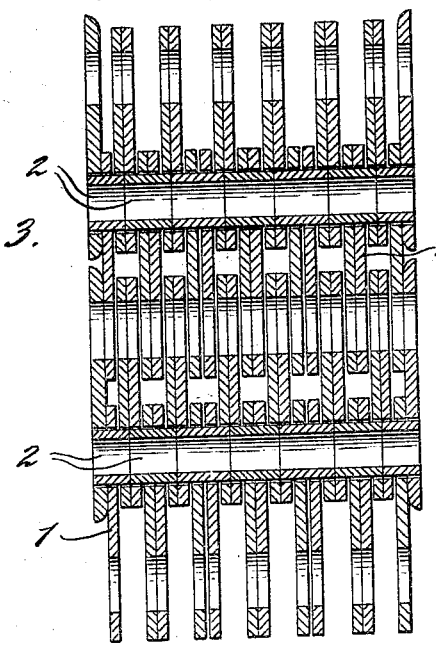
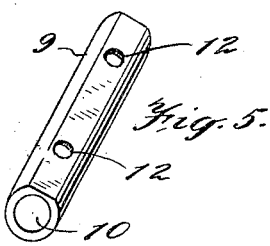
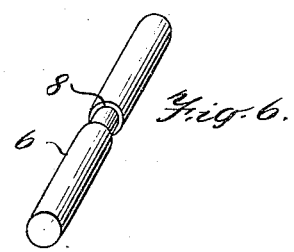
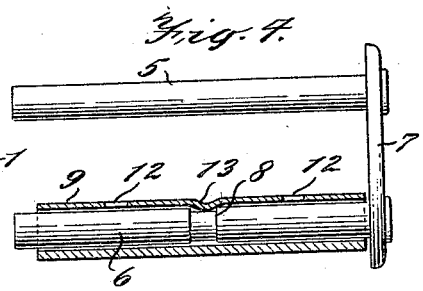

Patented June 3, 1924.

1,496,298

UNITED STATES PATENT OFFICE.

JOHN CURRY CHAPMAN, OF HARTFORD, CONNECTICUT, ASSIGNOR TO THE WHITNEY MANUFACTURING COMPANY, OF HARTFORD, CONNECTICUT, A CORPORATION OF CONNECTICUT.

CONNECTING LINK FOR DRIVE CHAINS.

Application filed April 19, 1923. Serial No. 633,253.

*To all whom it may concern:*

Be it known that I, JOHN C. CHAPMAN, a citizen of the United States, residing at Hartford, in the county of Hartford and State of Connecticut, have invented certain new and useful Improvements in Connecting Links for Drive Chains, of which the following is a specification.

My invention relates to drive chains and particularly to connecting links for such chains. My invention will be better understood by referring to the following description taken in connection with the accompanying drawings forming a part thereof and in which Figure 1 is a plan view of a portion of a chain to which my invention may be applied; Figure 2 is a side view of the chain shown in Fig. 1; Figure 3 is a sectional view on line 3—3 of Fig. 2; Figure 4 is a side elevation of a connecting link embodying my invention with the bushing shown in section; Figure 5 is a perspective view of the bushing and Figure 6 is a perspective view of the pin upon which the bushing as shown in Figure 5 is placed.

My invention relates to connecting links for drive chains of various types where bushings and rivets are used in the joint construction. Chains of this character are shown in Patent No. 959,047 granted May 24, 1910, and Patent No. 1,020,180 granted March 12, 1912, to W. J. Belcher.

In the drawings I have shown for illustrative purposes the type of chain shown in the latter of the above patents. The chain shown is made up of units 1, through the ends of which extend bushings 2 and through which bushings extend pins or rivets 3. The pins 3 are connected at their ends by side plates 4, the ends of the pins 3 being riveted as shown. In making up chains it is necessary that they be of different lengths, and it is also necessary that the ends of the chains be left free so that the chains may be placed upon the driving and driven gears or sprockets and the ends fastened together after the chains are so applied. This necessitates the use of connecting links for securely fastening the ends of the chains together. In the assembled portions of the chains the bushings 2 are placed through the openings in the ends of the chain units and are then fastened in the outer chain units. On account of the intermeshing of the chain units at the ends of the chains the bushings are not fastened in position in these openings at the time of shipment, but the bushings are supplied separately and assembled on the field. Heretofore, connecting links have been supplied wherein the cylindrical pins were riveted in a side plate, openings bored through the other ends of the pins, a bushing slipped over one of the pins and a cotter pin passed through the openings in the ends of the pins to hold the bushing thereon. This arrangement is unsatisfactory in many ways and is also somewhat expensive.

I have, therefore, devised a simple device, as shown in detail in Figure 4 of the drawings, wherein the connecting link comprises two pins 5 and 6, one end of each of which is riveted in a side plate 7. The pin 6 is provided with a circumferential groove 8 intermediate its ends and the bushing 9, as shown in Fig. 5, is provided with a cylindrical opening 10 therethrough and one side of the bushing is flattened as shown at 11. The bushing is also provided with two openings 12 for lubricating purposes. In preparing the connecting link, a bushing 9 is slipped on the pin 6 and by means of a suitable tool the wall of the bushing is depressed into the groove as shown at 13, in Figure 4, so that the bushing is prevented from slipping off of the pin. The portion 13, however, is not pressed downward sufficient to so contact with the reduced portion of the pin 6, as to interfere with the free rotative movement between the pin and the bushing. In the illustrative drawings I have shown the indentation 13 in the thinned part of the bushing wall, but this indentation may be made in any part of the bushing wall adjacent the groove 8. When the chain is to be assembled, the ends are brought to the position shown in Fig. 3 and the connecting link is inserted so that the pin 5 passes through the bushing 2 and the bushing 9 passes through the openings in the chain units 1. The openings in the units 1 are so shaped that the bushing fits therein and is held against rotation by reason of the flat portion thereon. A side plate similar to the side plate 7 is then placed on the ends of the pins 5 and 6, and these ends are riveted so that the plate is held in position.

From the foregoing, it will be evident that by the simple expedient shown in detail in Figure 4, a suitable connecting link is provided and provision is made, whereby the bushing is fixed on its pin, without, in any manner, interfering with the desired operation of the bushing on the pin. By reason of this arrangement the ends of the pins 5 and 6 are stronger than if an opening were made through them as has been done heretofore and the manufacturing cost of the connecting links is substantially reduced, while at the same time there is no possibility of the bushings becoming detached from the pins and becoming lost. This arrangement saves considerable time and trouble in the assembly of the chain. Many other advantages will be apparent to those skilled in the art.

While my connecting link is particularly useful in chains of the types above mentioned it will be evident that it may also be used in other types of chains and in some instances, special connecting units are provided for chains of the above types and I desire it to be understood that my connecting links may be used in connection with such special means.

I claim:—

1. A connecting link for chains comprising two pins connected together at one of their ends, one of said pins having a groove intermediate its ends and a bushing on said grooved pin and having a depressed portion entering said groove.

2. A connecting link for drive chains comprising two pins, one of said pins having a groove intermediate its ends and a bushing for said pin adapted to have a portion thereof indented into said groove.

3. A connecting link for drive chains comprising a pin having a circumferential groove therein and a bushing for said pin, said bushing having a thin portion adapted to be indented into said groove to hold the bushing on the pin.

4. A connecting link for drive chains comprising two parallel pins, a groove in one of said pins, side members for connecting the ends of said pins, and a bushing for said grooved pin having a depressed portion entering said groove.

5. A connecting link for drive chains comprising two pins one of which has a groove therein, means adapted to connect said pins together at one end and a bushing for said grooved pin having a round opening therethrough and a thinned portion adjacent said groove whereby the wall of the bushing may be indented into said groove to hold the bushing on the pin.

6. A connecting link for drive chains comprising two pins connected together at one of their ends, one of said pins having a circumferential groove therein, a bushing for said grooved pin having a round longitudinal opening therethrough and a wall adapted to be indented into said groove to hold said bushing in place on the pin and permit relative free rotation between the bushing and the pin.

JOHN CURRY CHAPMAN.